H. C. VELIE.
Horse-Rake.
No. 168,543. Patented Oct. 5, 1875.
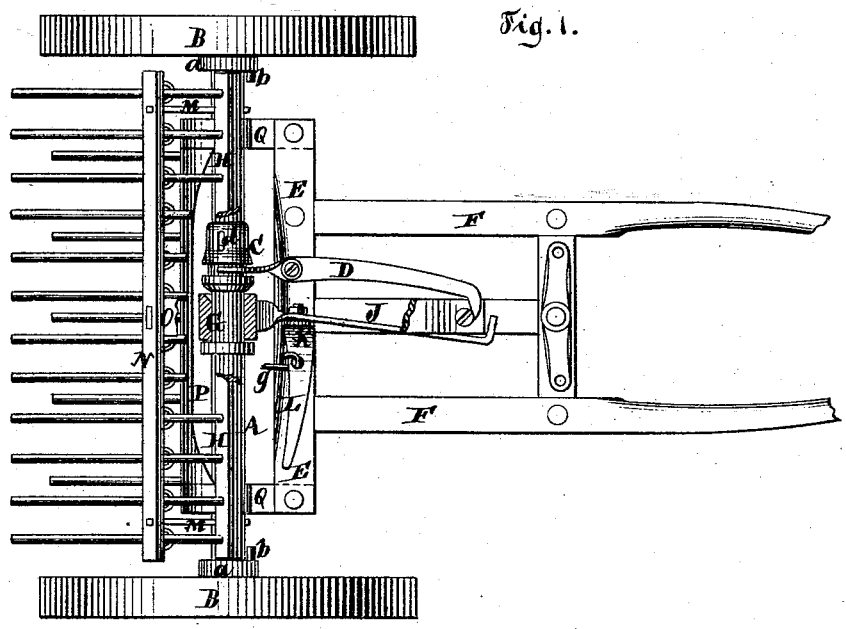
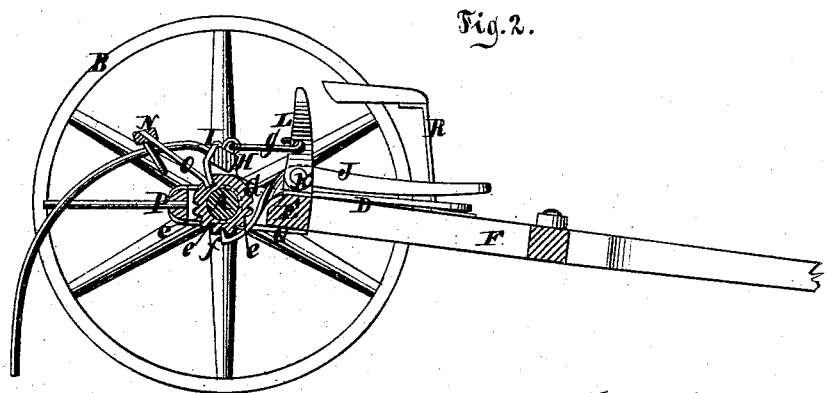
Witnesses.
Otto Hufeland
Chas. Wahlers.
Inventor.
Henry C. Velie
p'
Van Santvoord & Hauff
Att'ys

UNITED STATES PATENT OFFICE.

HENRY C. VELIE, OF POUGHKEEPSIE, NEW YORK, ASSIGNOR TO WALTER ADRIANCE, OF SAME PLACE.

IMPROVEMENT IN HORSE-RAKES.

Specification forming part of Letters Patent No. 168,543, dated October 5, 1875; application filed June 30, 1875.

*To all whom it may concern:*

Be it known that I, HENRY C. VELIE, of Poughkeepsie, in the county of Dutchess and State of New York, have invented a new and useful Improvement in Horse-Rakes, which improvement is fully set forth in the following specification, reference being had to the accompanying drawing, in which—

Figure 1 represents a plan or top view of my rake. Fig. 2 is a longitudinal central section.

Similar letters indicate corresponding parts.

My invention relates to certain improvements in horse-rakes in which the rake-head is raised in order to discharge the collected load from the rake-teeth.

My invention consists in the combination of a clutch and its operating-lever with a collar, which forms the support of the rake-head, both the clutch and the collar being mounted on the axle of the vehicle in such a manner that when the clutch is slid toward the collar, and interlocks with it, the collar partakes of the motion of the clutch, or of the axle, and by this means the rake-head is raised by the forward movement of the machine. The supporting-collar of the rake-head is provided with serrations, and with it is combined a retaining-lever, in such a manner that, by causing this lever to engage with the collar, or its serrations, the rake-head may be held in its raised position or in a lower position.

In the drawing, the letter A designates the axle of my rake, and B B are the wheels, which are fastened to the axle by means of disks $a$, mounted on the axle, and of pins $b$, which are passed through the disks, and through the hubs of the wheels. By removing the pins $b$ the wheels B B may be made to turn loosely on the axle, if for any purpose it is desired. The axle A contains at or near the middle a clutch, C, which is slotted, and slides on a guide-pin, $d$, which at the same time causes the clutch C to partake of the movement of the axle. The clutch C is provided with a suitable contraction to receive the forked end of a lever, D, which is pivoted to a cross-piece, E, connected to the axle A, and from which extend the thills F of the rake. Contiguous to the clutch C, on the axle A, is mounted loosely a collar, G, and to the collar is attached the head H, which carries the rake-teeth by a metallic band, I, or by any other suitable means. The collar G has a series of serrations or scallops, $e$, for a part or the whole of its circumference, constituting a form of ratchet, and a lever, J, pivoted to a bracket, K, of the cross-piece E, and having a toe, $f$, engages with the serrations of the collar. When the clutch-lever D is oscillated in the proper direction the clutch C interlocks with the collar G. If the vehicle is now moved forward, and the axle A is fast to the wheels, the clutch and the collar G partake of the movement of the axle and of the wheels B B, and the rake is raised from the ground by a partial revolution of the several parts. The load collected by the rake is thus discharged, with the aid of clearers, hereinafter described. When the rake has been raised, the clutch C may be moved away from the collar G, and the ratchet-lever J made to engage the serrations $e$ of the collar, and thereby the rake is firmly held in place. It is obvious that the rake may by this means also be held in a lower position. If the pins $b$ are removed, so as to loosen the axle from the wheels B B, the clutch C may be used for holding the collar G and the rake in a raised position, in which case a lever, L, pivoted to the bracket K serves to elevate the rake. This lever L is connected to the rake-head H by means of a link, $g$. The rake-head H is connected to the axle A by means of brackets M, which support also a bar, N, that forms part of the rake. This bar is connected also to the collar G by a band, $o$, contiguous to the band I, that forms the connection of the rake-head. The letter P designates the clearer-bar that carries the clearers that assist in removing the collected load from the rake. This bar is connected to the axle A by means of clips or hounds Q, one end of which is fastened to the cross-piece E, while the remaining part of the hounds is turned over the clearer-bar and the axle, as clearly shown in the drawing. A firm connection of the clearer-bar with the axle is thus obtained. The several levers D J L are within convenient reach of the driver when seated on the seat R, and the levers may be arranged to be operated by hand or by foot-power. The clutch C is preferably made to act by frictional contact on the collar G, and has the form of a "friction-clutch." If seen fit, a pawl and ratchet-wheel may be used in lieu of the pins $b$, for the purpose of connecting the axle and the wheels B B together.

What I claim as new, and desire to secure by Letters Patent, is—

1. In a horse-rake, the clutch C and clutch-lever D, in combination with the collar G and rake-head H, the clutch and the collar being mounted on the axle A, substantially as described.

2. The combination of the collar G, having the serrations $e$, and supporting the rake-head H, with the lever J, substantially as described.

In testimony that I claim the foregoing I have hereunto set my hand and seal this 19th day of June, 1875.

HENRY C. VELIE. [L. S.]

Witnesses:
JNO. P. A. VAIL,
CHAS. C. GIFFARD.